UNITED STATES PATENT OFFICE.

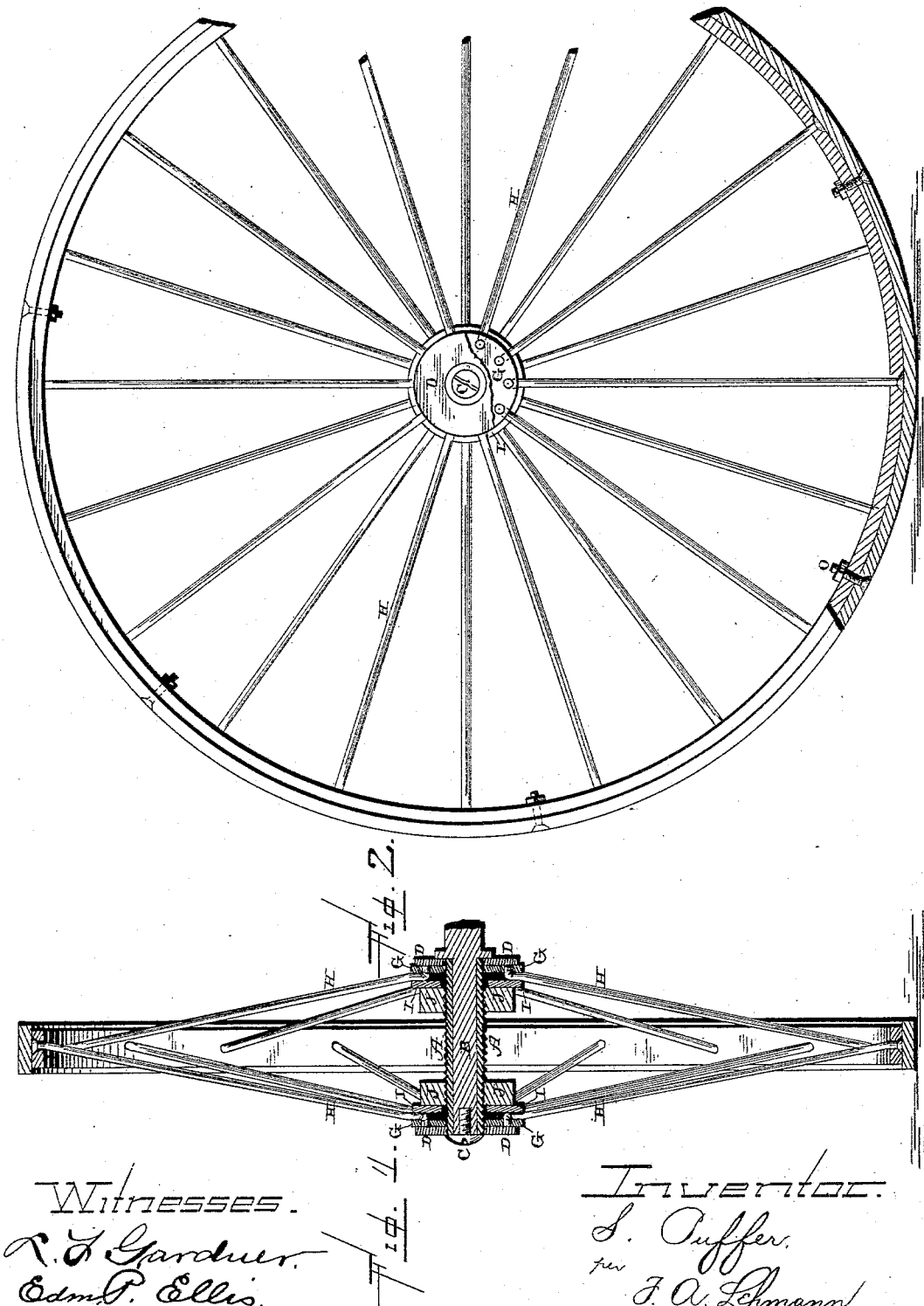

STEPHEN PUFFER, OF OXFORD, NEW YORK.

VEHICLE-WHEEL.

SPECIFICATION forming part of Letters Patent No. 381,509, dated April 17, 1888.

Application filed December 6, 1887. Serial No. 257,108. (No model.)

*To all whom it may concern:*

Be it known that I, STEPHEN PUFFER, of Oxford, in the county of Chenango and State of New York, have invented certain new and useful Improvements in Vehicle-Wheels; and I do hereby declare the following to be a full, clear, and exact description of the invention, such as will enable others skilled in the art to which it pertains to make and use it, reference being had to the accompanying drawings, which form part of this specification.

My invention relates to an improvement in vehicle-wheels; and it consists in the combination of a hub which is screw-threaded externally, nuts which are applied to the hub, two screw-threaded clamping-plates, which are also applied to the outer ends of the hub, a perforated disk at each end to receive the inner bent ends of the spokes, and which perforated disks are placed between the pairs of plates and the spokes, which have their inner ends bent at right angles, so as to pass through holes in the disks, as will be more fully described hereinafter.

The object of my invention is to provide a metallic wheel for vehicles so constructed in case one of the spokes should become broken or injured it can be readily removed and replaced by another.

Figure 1 is a vertical section of a wheel embodying my invention. Fig. 2 is a side elevation of the same, partly in section.

A represents the metallic hub, which is externally screw-threaded from end to end, and which is placed upon the spindle B and held in position by the large-headed screw C, as shown. The spindle, as here shown, has a screw-threaded opening in its end, and the screw C is screwed into it; but, if so desired, the usual form of nut may be used to hold the hub in place. Upon each end of the hub A is placed a screw-threaded plate, D, which can be adjusted back and forth upon the hub, and inside of these plates D are placed the perforated disks G, through which the inner ends of the spokes H pass. These disks bear against the inner sides of the plates D, as shown, and are thereby prevented from having any outward movement upon the hub A. Bearing against the spokes, near their inner ends, are the loosely-fitting plates I, which prevent the ends of the spokes from becoming detached from the disks G, and these plates I are forced tightly against the spokes by means of the nuts J, which are adjustable back and forth on the hub. After the ends of the spokes have been passed through the perforations in the disks G, the plates I are screwed tightly up against the inner edges of the spokes, and then the nuts J are screwed tightly against the plates I, so as to keep the plates in place. The spaces between the disks and the plates I are to be filled with metal which is easily fused, for the purpose of filling up all of the spaces between the plates and the disks and to make the parts as solid as possible.

In case one of the spokes should become broken or injured, the spokes H are formed from heavy wires and have their inner ends bent at right angles, as shown, and have suitably-shaped heads upon their outer ends where they pass through the felly. The tire is bolted to the felly by suitable nuts and bolts, O, as shown in Fig. 2, so that the tire can be removed from the metallic felly at any time. Should any one of the spokes become broken or injured, it is only necessary to remove the tire, screw the nut J and plate I inward upon the hub, when the inner end of the spoke can be readily detached from the disk G and then removed entirely from the wheel. By means of this construction a person has but to buy the wires, form a suitable head upon one end by upsetting the metal, and bend the inner end, when he can repair the wheel himself without the loss of time and the expense of sending the wagon to the wagon-maker. By making the hub to extend only slightly beyond the plate D and having a round head on the screw C there are no projections for one wheel to catch against another in passing.

Having thus described my invention, I claim—

The combination of externally-screw-threaded hub, the screw-threaded plates D applied to its ends, the perforated disks through which the inner ends of the spokes pass, the clamping-plates I, the nuts J, the spokes, and the felly, substantially as shown and described.

In testimony whereof I affix my signature in presence of two witnesses.

STEPHEN PUFFER.

Witnesses:
HENRY ASHCRAFT,
HENRY J. GALPIN.